United States Patent
Choh

(10) Patent No.: US 8,278,607 B2
(45) Date of Patent: Oct. 2, 2012

(54) HEATING APPARATUS

(75) Inventor: Jeong Deok Choh, Gimpo (KR)

(73) Assignee: GTouch Co., Ltd. (KR)

( * ) Notice: Subject to any disclaimer, the term of this patent is extended or adjusted under 35 U.S.C. 154(b) by 287 days.

(21) Appl. No.: 12/676,962

(22) PCT Filed: Feb. 29, 2008

(86) PCT No.: PCT/KR2008/001192
§ 371 (c)(1),
(2), (4) Date: Mar. 8, 2010

(87) PCT Pub. No.: WO2009/035192
PCT Pub. Date: Mar. 19, 2009

(65) Prior Publication Data
US 2010/0320190 A1 Dec. 23, 2010

(30) Foreign Application Priority Data
Sep. 10, 2007 (KR) .......... 10-2007-0091805

(51) Int. Cl.
*H05B 3/02* (2006.01)
*H05B 1/00* (2006.01)
(52) U.S. Cl. ........ 219/539; 219/546; 219/212; 219/213; 219/541; 219/542; 219/543; 219/544
(58) Field of Classification Search .................. 219/539, 219/546, 213, 541–4
See application file for complete search history.

(56) References Cited

U.S. PATENT DOCUMENTS
7,072,578 B2  7/2006 Saito et al.

FOREIGN PATENT DOCUMENTS
| KR | 20-0335418 | 12/2003 |
| KR | 20-0417945 | 6/2006 |
| KR | 20-417945 | * 6/2006 |

OTHER PUBLICATIONS
PCT International Search Report—PCT/KR2008/001192 dated May 9, 2008.

* cited by examiner

*Primary Examiner* — Shawntina Fuqua
(74) *Attorney, Agent, or Firm* — Cantor Colburn LLP

(57) ABSTRACT

Disclosed herein is a heating apparatus. The heating apparatus includes a plurality of heating bars, electric wires, and connection members. Each of the heating bars has a conductive carbon heating element and an insulating outer coat surrounding the carbon heating element. The electric wires are connected to respective ends of each of the heating bars to enable electricity to flow to the carbon heating elements. Each of the connection members includes insertion portions and at least one seating portion. The insertion portions have respective tip portions which are configured to pass through any of the electric wires and to be inserted into any of the carbon heating elements of the heating bars. The seating portion is provided at the upper ends of the insertion portions to be seated on the electric wire.

9 Claims, 3 Drawing Sheets

[Fig. 1]
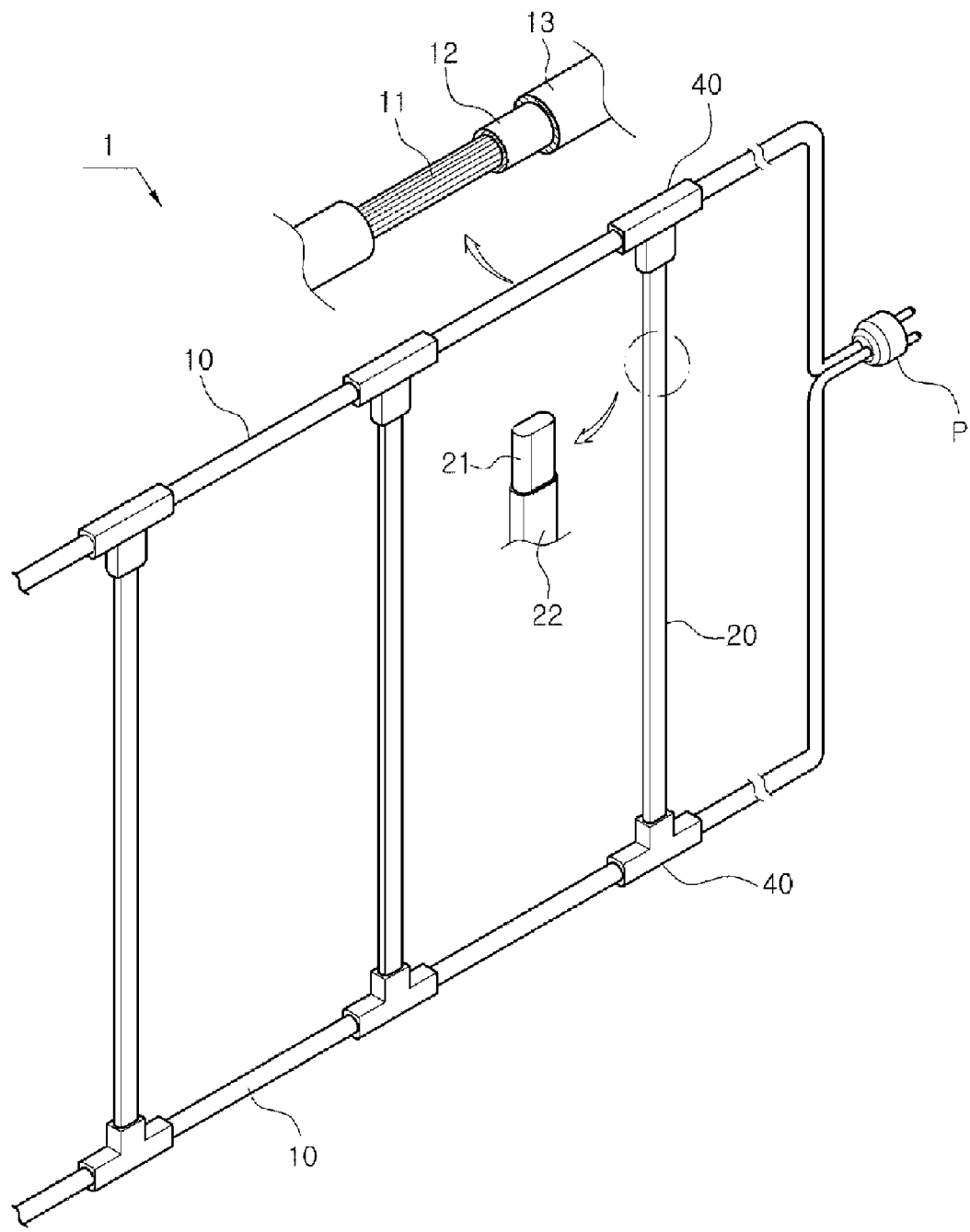

[Fig. 2]
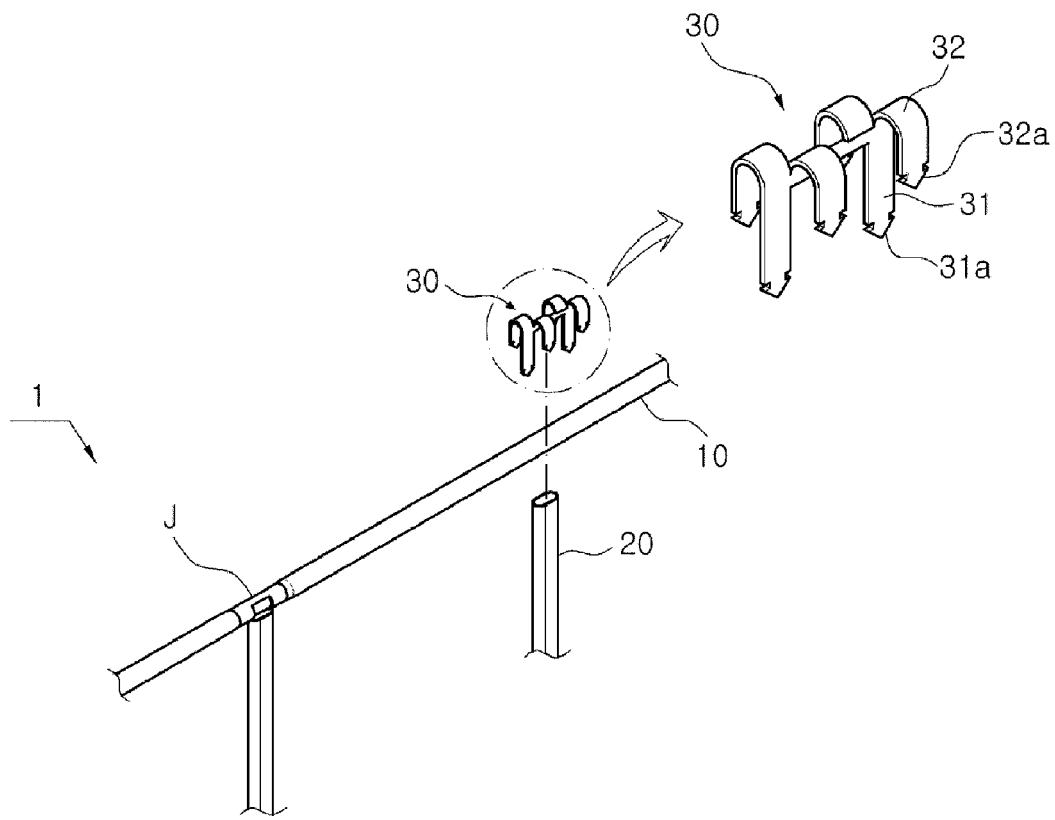
[Fig. 3]
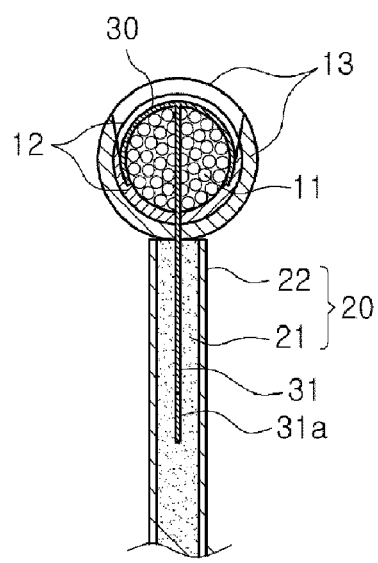

[Fig. 4]
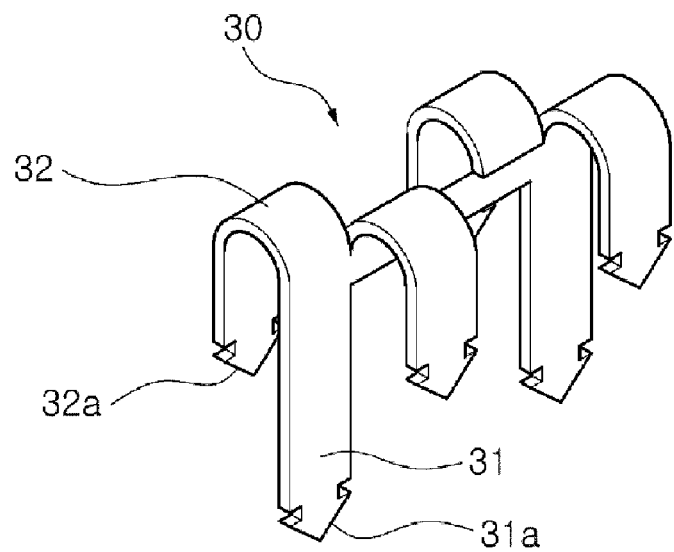
(a)
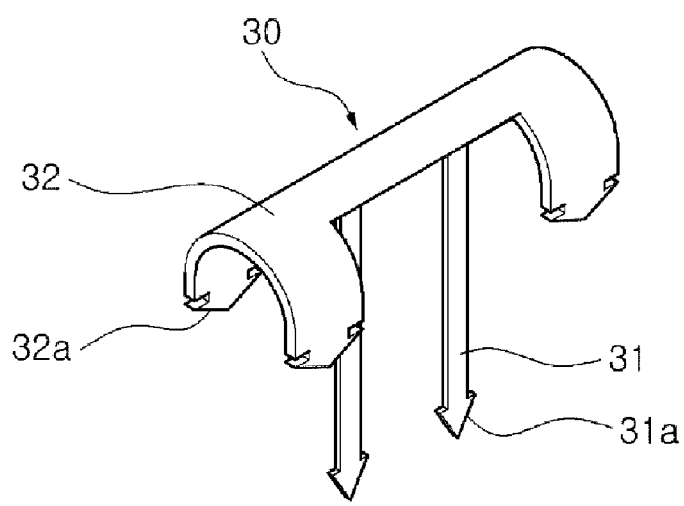
(b)

HEATING APPARATUS

TECHNICAL FIELD

The present invention relates to a heating apparatus, which is installed in residential or commercial buildings, such as homes, schools, hotels, live-work studios and pensions, and, more particularly, to a heating apparatus, which enables the seating portion of each connection member to directly connect heating bars and electric wires to each other, and enables the tip portions of the insertion portions of the connection member to be inserted into the heating bars, thus ensuring a secure connection between the electric wires and the heating bars without requiring that work for removing the sheaths of the electric wires be conducted.

That is, the connection members according to the present invention enable the electric wires and the heating bars to be easily and quickly connected to each other, and ensure both a secure connection and excellent conductivity, and thus a more reliable heating apparatus can be provided.

BACKGROUND ART

Floor heating using low-temperature radiation based on electricity is a construction technology that has recently and attracted new attention. Typical heating elements include Nichrome wire, carbon fiber, and a plate-shaped heating element. All of the above-described elements have a function of emitting far infrared rays.

In Korean Utility Model Appl. No. 20-2005-37270 (Registration No.: 20-417945, Published date: Jun. 7, 2006), 'Heating Apparatus' (hereinafter referred to as the 'first prior art') filed on Dec. 31, 2005 by the inventor of the present invention, a heating apparatus, which includes heating wires, electric wires and connection members, and is configured such that the insertion portion of each connection member is provided with a wedge part for preventing a tip portion from being pulled out, was proposed.

However, in the first prior art, connection is achieved in such as way that a portion of the sheath of a electric wires is first removed, a connection member is connected to surround the conductor of the electric wire, high-frequency or ultrasonic wave heating is performed, the carbon heating element is melted by the heat that is generated by the high-frequency or ultrasonic wave heating when the carbon heating element of the heating wire is pressed by the tip portion of the insertion portion of the connection member press, and the tip portion is inserted into the heating element.

That is, the sheath of the electric wire is removed, one end of the connection member is brought into contact with the conductor, the other end of the connection member is bent to surround the conductor, high-frequency or ultrasonic wave heating to a predetermined temperature is performed on the connection member connected to the conductor, and the connection member is inserted into the carbon heating element.

However, the first prior art requires work for removing the outer coats of the electric wires in advance at the locations at which the heating wires are connected, and heating work after the connection members are connected to the conductors, and, in addition, separately requires connection work for inserting heated connection members into the heating wire, so that there are inconveniences in that the number of working processes is increased and in that a worker manually performs the individual processes.

Furthermore, the connection of the connection members is made after the outer coats of the electric wires have been removed, so that there is no effective means for preventing humidity and dust from entering through external covers.

Furthermore, in the case where the heating apparatus is used in such a way as to be buried in a floor surface or a support surface, the outer coats of the electric wires necessarily come into close contact with concrete that forms the floor surface or the support surface. Accordingly, if a crack in the concrete occurs after a period of time has elapsed, a problem occurs in that the outer coats of the electric wires, which are in close contact with the concrete, are also broken and, as a result, are damaged.

DISCLOSURE OF INVENTION

Technical Problem

Accordingly, the present invention has been proposed to solve the above-described problems, and an object of the present invention is to provide a heating apparatus, which requires no work for removing the outer coats of electric wires because connection members are used, and enables electric wires and heating bars to be securely connected to each other at one time without performing heating work using a separate heat source, so that work can be easily and quickly conducted and, in addition, the number of working processes is reduced, with the result that manufacturing costs can be reduced.

Another object of the present invention is to provide a heating apparatus, in which the seating portion of each connection member is formed to have an arc shape in order to increase conductivity, and tip portions are formed in the insertion portions of the connection member to be inserted into the carbon heating element of each heating bar, thus ensuring a secure connection.

A further object of the present invention is to provide a heating apparatus, which enables outer protection coats to surround the respective sheaths of electric wires, which come into contact with concrete that forms a floor surface or a support surface, thus preventing the electric wires from being damaged due to a crack in the concrete or by external impacts.

Technical Solution

In order to accomplish the above objects, the present invention provides a heating apparatus, including: a plurality of heating bars, each having a conductive carbon heating element and an insulating outer coat surrounding the carbon heating element; electric wires connected to respective ends of each of the heating bars to enable electricity to flow to the carbon heating elements; and connection members, each comprising: insertion portions, which have respective tip portions which are configured to pass through any of the electric wires and to be inserted into any of the carbon heating elements of the heating bars; and at least one seating portion, which is provided at the upper ends of the insertion portions to be seated on the electric wire.

Furthermore, the seating portion of each of the connection members has an arc shape so as to surround the electric wire.

Furthermore, the seating portion of each of the connection members has tip portions.

Furthermore, each of the electric wires includes: a sheath surrounding a conductor; and an outer protection coat surrounding the sheath.

Furthermore, covers are coupled to respective connection portions between the connection members and the electric wires.

Furthermore, the connection members are inserted into both the electric wires and the heating bars by a pneumatic shooting device.

Advantageous Effects

The heating apparatus according to the present invention requires no work for removing the outer coats of electric wires because connection members are used and, in addition, requires no heating work using a separate heat source, so that work can be easily and quickly conducted and, in addition, the number of working processes can be reduced, with the result that the manufacturing costs can be reduced.

Furthermore, the electric wires can be prevented from being damaged due to impacts that are transferred from the outside even upon use for a long time, thus increasing efficiency.

Meanwhile, outer protection coats, which are used to surround the sheaths of the electric wire, and material having a high application rate are used as covers, so that humidity and foreign material can be prevented from entering, in particular, higher efficiency can be achieved in wet heating.

BRIEF DESCRIPTION OF THE DRAWINGS

FIG. 1 is a coupled perspective view of a heating apparatus according to the present invention;
FIG. 2 is an exploded perspective view of FIG. 1;
FIG. 3 is a side sectional view of a connection portion; and
FIG. 4 is perspective views showing embodiments of a connection member.

DESCRIPTION OF REFERENCE NUMERALS OF PRINCIPAL ELEMENTS

| | |
|---|---|
| 1: | heating apparatus |
| 10: | electric wire |
| 11: | conductor |
| 12: | sheath |
| 13: | outer protection coat |
| 20: | heating bars |
| 21: | carbon heating element |
| 22: | insulating outer coat |
| 30: | connection member |
| 31: | insertion portions |
| 31a, 32a: | tip portions |
| 32: | seating portions |
| 40: | cover |

BEST MODE FOR CARRYING OUT THE INVENTION

An embodiment of a heating apparatus according to the present invention is described in detail with reference to the accompanying drawings below.

As shown in FIGS. 1 to 3, the heating apparatus 1 according to the present invention includes a pair of electric wires 10, each of which is continuously provided in the longitudinal direction thereof, a plurality of heating bars 20, which are located between the electric wires 10 and are spaced apart from each other at regular intervals and each of which is provided with a conductive carbon heating element 21 and an insulating outer coat 22 surrounding the carbon heating element 21, and connection members 30, which are used to connect the heating bars 20 and the electric wires 10 to each other and which enable electricity, which flows through the electric wires 10, to flow to the carbon heating elements.

In the heating apparatus according to the present invention, the heating bars 20 are spaced apart from each other at regular intervals. The intervals are generally determined to fall within a range of 5~20 cm. Furthermore, the heating bars 20 are installed such that the intervals are decreased in the case where a high floor temperature and a large amount of heating are needed, but such that the intervals are increased in the case where a low floor temperature is needed.

Furthermore, each of the heating bars 20 includes a carbon heating element 21, and an insulating outer coat 22 surrounding the carbon heating element 21, and is formed to have a bar shape, a section of which is elliptical.

The carbon heating element 21 is formed of a mixture of carbon and polyethylene, and emits far infrared rays having a wavelength of 8~14 μm when electricity flows therethrough.

The far infrared rays have an emissivity of more than 90%. The insulating outer coat 22 is made of polyethylene resin.

The heating temperature of the heating bars 20 is generally maintained within a range of 60~70 degrees, and may be controlled by adjusting the characteristics of the insulating outer coat 22 and a mixture ratio between carbon and polyethylene.

Furthermore, the heating bars 20 have advantages in that they are uniformly and rapidly heated and in that they do not emit any electromagnetic waves.

In the heating apparatus according to the present invention, the electric wires 10 are connected to the respective ends of each heating bar 20 so that electricity flows through the carbon heating element 21. Each of the electric wires 10 is implemented using a typical electric wire, which includes a conductor 11 for conducting electricity, and a sheath 12 surrounding the conductor.

In particular, each of the electric wires 10 further includes an outer protection coat 13 surrounding the sheath 12. The outer protection coat 13 is integrally formed over the entire electric wire 10 using elastic material.

Furthermore, the outer protection coat 13 is formed so that it does not come into close contact with the sheath 12 of the electric wire 10. When the outer protection coat 13 comes into close contact with concrete and when a crack in or damage to the concrete occurs, the electric wire 10, which is located in the outer protection coat 13, is not in close contact with the outer protection coat 13, so that only the outer protection coat 13 is stretched, thanks to the elasticity of the outer protection coat 13, and the internal electric wire 10 is not damaged.

In the heating apparatus according to the present invention, it is preferred that the connection members 30 be used to connect the electric wires 10 and the heating bars 20 to each other, and that they be made of conductive material for conducting electricity.

Each of the connection members 30 includes insertion portions 31, which are provided with respective tip portions 31a, which are driven into the carbon heating element 21 of each heating bar 20, and at least one seating portion 32, which is provided in the upper end of the insertion portions 31 to be seated on the conductor 11 of the electric wire 10.

With reference to the connection members 30 shown in FIG. 4, the seating portion 32 has a diameter identical to or greater than the external diameter of the conductor 11, and has an arc shape so as to surround the conductor 11, and thus the connection members 30, which are shot at high speed, can be stopped while surrounding the conductor 11.

In this case, the seating portion 32 is formed to have a semicircular shape so as to surround the conductor 11.

Furthermore, additional tip portions 32*a* may be formed in the seating portion 32 so as to pass through the sheath 12 and the outer protection coat 13, which surround the conductor 11, and to come in contact with the conductor 11. The seating portion 32, having an arc shape, may be formed to surround the sheath 12.

Furthermore, when the connection member 30 is shot at a high speed by a pneumatic shooting device (not shown in the drawings) or a cylinder pressure device, the tip portions 31*a* of the insertion portions 31 sequentially pass through the outer protection coat 13, the sheath 12 and the conductor 11, and are subsequently driven into the carbon heating element 21 of a heating bar 20.

That is, the insertion portions of the connection member 30 are securely driven into the carbon heating element 21 after passing through the electric wire 10 due to a high shooting speed. In this case, the seating portion 32 surrounds the conductor 11.

Furthermore, additional tip portions 32*a* may be formed in the seating portion 32 so that the seating portion 32 can be inserted into the conductor 11.

In this case, it is preferred that a pair of seating portions 32 be formed to have a width smaller than the external diameter of the conductor 11.

In the heating apparatus according to the present invention, covers 40 are formed to surround connection portions J between the connection members 30 and the electric wires 10. The connection members 30 pass through the electric wires 10 at high speed, so that the case where the outer protection coat 13, which is formed at the outermost side, and the sheath 12, which is provided in the outer protection coat, are damaged occurs.

Accordingly, the covers 40 protect damaged portions by surrounding them, thus preventing humidity and foreign materials from entering from the outside.

That is, the covers 40 are formed to have a symmetrical cross shape using synthetic resin, and to surround the connection portions J between the heating bars 20 and the electric wires 10, which are connected to have a 'T' shape by the connection member 30.

Furthermore, the covers 40 are formed on the connection portions J by an injection molding machine (not shown in the drawings).

That is, the electric wires 10 and the heating bars 20 are connected to each other to form a shape similar to that of a train rail, and the cover 40 hermetically seals the connection portions J when the connection portions J pass through the injection molding machine, which is provided at two ends of the electric wires 10, and thus water tightness and a power saving effect can be improved.

In the drawings, reference numeral P indicates a plug that is used to supply power to the electric wires 10.

The connection of the heating apparatus according to the present invention is described below.

First, a pair of electric wires 10 is arranged with a predetermined interval therebetween, and heating bars 20 are arranged between the electric wires 10 at regular intervals. The upper and lower ends of each heating bars 200 are brought into close contact with the respective electric wires 10. A connection member 30 is shot at high speed or pushed at high pressure by the pneumatic shooting device or the cylinder pressure device in the direction opposite to that in which a heating bar 20 comes into contact with an electric wire 10.

The tip portions 31*a* of the insertion portions 31 of the connection member 30, which is shot at high speed, sequentially pass through the outer protection coat 13, the sheath 12 and the conductor 11 and, subsequently, are driven into the carbon heating element 21 of the heating bar 20. In this case, the seating portion 32, which is provided in the upper ends of the insertion portions 31, is seated on the conductor 11.

In this case, the seating portion 32 is formed to have an internal diameter identical to the external diameter of the conductor 11, thus stably and securely surrounding the conductor 11. Furthermore, additional tip portions 31*a* may be formed in the seating portion 32 so as to be driven into the conductor 11.

Although the detailed embodiments of the heating apparatus according to the present invention have been described above, the present invention is not defined by the above-described description, and may be modified and varied by those skilled in the art in various ways within the scope and spirit of the accompanying claims. Such modifications and variations must be also understood as being included in the scope of the present invention.

The invention claimed is:

1. A heating apparatus, comprising:
a plurality of heating bars, each having a conductive carbon heating element and an insulating outer coat surrounding the carbon heating element;
electric wires connected to respective ends of each of the heating bars to enable electricity to flow to the carbon heating elements; and
connection members, each comprising: insertion portions, which have respective tip portions which are configured to pass through any of the electric wires and to be inserted into any of the carbon heating elements of the heating bars; and at least one seating portion, which is provided at upper ends of the insertion portions to be seated on the electric wire, wherein the connection members are inserted into both the electric wires and the heating bars by a pneumatic shooting device.

2. The heating apparatus according to claim 1, wherein the seating portion of each of the connection members has an arc shape so as to surround the electric wire.

3. The heating apparatus according to claim 2, wherein the seating portion of each of the connection members has tip portions.

4. The heating apparatus according to claim 1, wherein each of the electric wires comprises:
a sheath surrounding a conductor; and
an outer protection coat surrounding the sheath.

5. The heating apparatus according to claim 1, wherein covers are coupled to respective connection portions between the connection members and the electric wires.

6. The heating apparatus according to claim 2, wherein each of the electric wires comprises:
a sheath surrounding a conductor; and
an outer protection coat surrounding the sheath.

7. The heating apparatus according to claim 3, wherein each of the electric wires comprises:
a sheath surrounding a conductor; and
an outer protection coat surrounding the sheath.

8. The heating apparatus according to claim 2, wherein covers are coupled to respective connection portions between the connection members and the electric wires.

9. The heating apparatus according to claim 3, wherein covers are coupled to respective connection portions between the connection members and the electric wires.

* * * * *